WAITE & SENOR.
Coffee Pot.
No. 583. Reissued Aug. 10, 1858.
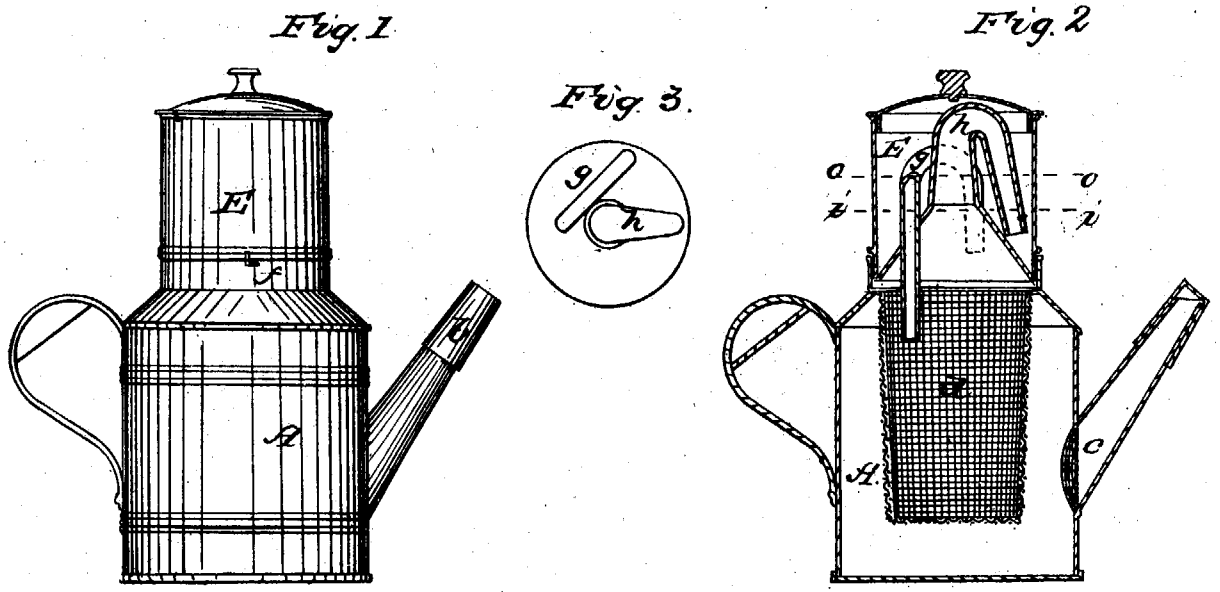
THE NORRIS PETERS CO., WASHINGTON, D. C.

UNITED STATES PATENT OFFICE.

CHARLES B. WAITE AND JOSEPH W. SENER, OF FREDERICKSBURG, VA.

IMPROVEMENT IN COFFEE-POTS.

Specification forming part of Letters Patent No. 14,748, dated April 22, 1856; Reissue No. 583, dated August 10, 1858.

*To all whom it may concern:*

Be it known that we, CHAS. B. WAITE and JOS. W. SENER, both of Fredericksburg, in Spottsylvania county, and State of Virginia, have invented certain new and useful Improvements in Coffee-Pots and other Cooking-Boilers; and we do hereby declare that the following is a full, clear, and exact description thereof, reference being had to the accompanying drawings through letters of reference marked thereon, forming part of this specification, and in which—

Figure 1 represents the exterior of the coffee pot or boiler. Fig. 2 is a sectional view taken through the spout and handle of the same. Fig. 3 is a plan of the interior of the condenser.

The same letters of reference occurring in the several figures denote corresponding parts.

Our invention consists in a novel and effective arrangement of the condensing apparatus of a boiler for preserving the fine aroma (of coffee, tea, or other articles of food, or herbs, roots, &c., used for medicinal purposes and the like, the extract of which is obtained by boiling) which escapes with the steam when boiled in an open or common boiler. For this purpose a variety of condensing-boilers have been devised and patented, all of which have been found to possess some objectionable feature, either in the difficulty of cleaning, the danger of explosion, or the expense of construction, all of which we claim to have overcome in the production of a self-operating condensing-boiler, every part of which is easily cleaned, of simple and cheap construction, and perfectly safe.

To enable others to make and use our invention, we will describe its construction and operation by referring to the drawings, in which—

A represents the boiler, which may be made of any ordinary form, constructed with the opening at the top somewhat contracted, but yet sufficiently large to pass the hand through for the purpose of cleaning. On the end of the spout is a cap or stopper, *b*, to prevent the escape of steam therefrom while boiling. A perforated plate or strainer, *c*, covers the opening of the spout inside the boiler. A cylindrical or cup-formed strainer, *d*, may also be used inside the boiler to contain the coffee or other article to be boiled, if thought desirable. A cylindrical or other shaped chamber, E, is made to fit on the top of the boiler, and is secured thereto by lugs *f*, which tighten in the manner of a bayonet-joint, or by a screw or other suitable device. This chamber E, which we shall hereinafter call the "condenser," is formed with a conical or convex bottom, from the apex of which rises a tapering tube, which is bent over and extends downward very nearly to the bottom of the condenser. Another (siphon formed) tube, *g*, is inserted in the condenser, the shorter leg of which is placed as near the bottom thereof as convenient to draw off its contents, the longer leg passing through the conical bottom of the condenser into the boiler. On the top of the condenser is a cover made to fit either it or the boiler when the condenser is removed.

There are two ways of using this boiler, both of which we will now describe.

First, the required quantity of water is put into the boiler and the coffee or other ingredient to be boiled with it; or, if the strainer *d* be used, it is measured into it and inserted in the boiler, the spout being then stopped with the cap *b* and the condenser put onto the boiler with a small quantity of water in it, sufficient to cover the end of the steam-pipe *h* about to the level indicated by the red line *i*, when it is placed on the fire and made to boil as long as desired. The steam arising from the boiler passes over through the tube *h* into the water in the condenser, which absorbs all the aroma. When boiled sufficiently, a little cold water is poured onto the siphon and steam-pipe, which condenses the steam in the boiler, causing a vacuum, when the siphon *g* is instantly charged, and draws off the entire contents of the condenser into the boiler, which suddenly checks its boiling and causes it to settle down perfectly clear, ready for use.

The second mode is by putting the coffee or other ingredient and water into the boiler as in the first case, and then filling the condenser with water to a little below the bend of the siphon—say about the red line *o*. It is then made to boil rapidly, as before, until the steam, passing over into the condenser, raises the water therein to the level of the bend of the siphon, when it becomes charged and im mediately drains the condenser into the boiler, when the decoction is ready for use, as in the former mode. In this mode the time of boiling is regulated by the quantity of water first put into the condenser. If filled nearly to the bend of the siphon, it will take but a short time to raise it by the condensed steam high enough to charge the siphon. If but a small quantity be put in, it will take much longer. A little observation will show the user the best quantity to obtain the greatest amount of extract from a given quantity of material. Some articles will require more boiling than others; therefore it is not deemed desirable to lay down any fixed rule. Suffice it to say that, by varying the quantity of water put into the condenser, the operation may be completed in from two to thirty minutes.

During the time of boiling the smell of the ingredients is not perceptible, as in the use of the common or open boiler, thus proving that all the aroma which flies off with the steam when using the common boiler is retained in the condenser and eventually returned to the boiler. It will also be evident that as the steam at all times has a free escape into the condensing water instead of depending upon condensing-surfaces surrounded by water, as in other condensing-boilers, which must shortly become so much heated as to lose their condensing properties, there is no possibility of explosion; and as nothing but steam and water ever pass through the tubes they will not become foul, while all the other parts of the apparatus are perfectly accessible for cleaning.

Having thus described our invention, we wish to be understood that we do not claim a condensing-boiler; but

What we do claim as new, and desire to secure by Letters Patent, is—

The arrangement herein described, whereby the steam from the boiler is discharged into the water in the condenser, which absorbs the aroma, in combination with the siphon for returning the contents of the condenser into the boiler, substantially as set forth.

In testimony whereof we hereunto subscribe our names this 20th day of July, 1858, before two subscribing witnesses.

CHARLES B. WAITE.
J. W. SENER.

Witnesses:

F. P. WELLFORD,
C. WISTAR WALLACE.